United States Patent [19]

Hopkins

[11] Patent Number: 4,704,570
[45] Date of Patent: Nov. 3, 1987

[54] POWER CONTROLLER

[76] Inventor: Harry C. Hopkins, Rte. 5, Box 883, Williamston, N.C. 27892

[21] Appl. No.: 869,172

[22] Filed: May 30, 1986

[51] Int. Cl.$^4$ .............................................. H02P 5/40
[52] U.S. Cl. .................................... 318/729; 318/812
[58] Field of Search ........................ 318/729, 798, 812

[56] References Cited

U.S. PATENT DOCUMENTS

| | | | |
|---|---|---|---|
| 4,333,046 | 6/1982 | Lee ........................................ | 318/729 |
| 4,388,578 | 6/1983 | Green et al. .......................... | 318/729 |
| 4,426,609 | 1/1984 | Nagy et al. ........................... | 318/729 |
| 4,459,529 | 7/1984 | Johnson ............................... | 318/729 |
| 4,469,998 | 9/1984 | Nola ..................................... | 318/729 |

OTHER PUBLICATIONS

Marshall Space Flight Center, "Fast-Response Power Saver for Induction Motors," NASA Tech Briefs, Spring 1979, pp. 10–11.
Nola, F. J., "Circuit Saves Power in AC Induction Motors", EON 9-5-79. p. 185.

Primary Examiner—David Smith, Jr.
Attorney, Agent, or Firm—Darby & Darby

[57] ABSTRACT

A motor drive circuit controlling the period of each cycle of line voltage which is supplied through an electronic switch to a motor winding. The phase difference between the current through and the voltage across the winding is measured and compared to a reference. The duration of the period of a cycle when the switch is closed and supplies power to the motor winding is varied in relation to the phase comparison so as to maintain an optimal phase angle or power factor for the motor. To eliminate misfiring of the switches in a single phase unit, an a.c. coupled power supply is used to power the control circuits and a varistor is located across the line. Also, fuses are used to protect the circuitry. In a three phase circuit, resistive dividers in current and voltage sensing circuits are matched within 1% of each other to provide proper triggering of the switches of each phase with respect to each other.

14 Claims, 6 Drawing Figures

POWER CONTROLLER

TECHNICAL FIELD

This invention relates to motor drive circuits and, more particularly, to motor drive circuits that control the power factor so as to save energy.

BACKGROUND ART

As set forth in U.S. Pat. No. 4,052,648 of Nola, the current through the windings of an induction motor lags behind the applied voltage by an angular amount. The cosine of the angle is called the power factor.

A motor will operate most efficiently at one particular power factor or angular relationship between voltage and current. For the motor in the Nola patent, this optimal amount is 30°. However, as the load on the motor decreases, the lag increases and the motor becomes inefficient. Thus, induction motors operating under light loads waste energy. Given the existence of several million electric motors, as stated in U.S. Pat. No. 4,426,609 of Nagy et al., it can be appreciated that the saving of even a little energy in each motor can represent a significant amount.

Nola, in U.S. Pat. No. 4,052,648, proposed that this energy be saved by controlling the power factor of the energy supplied to the motor so that it remains near its optimal condition, even when the load is reduced. According to Nola, the power factor is controlled by locating an electronic switch, e.g. a triac or SCR, in series between the power line supply voltage and the motor. In addition, various circuits are used to measure the phase difference between the voltage applied to the motor and the current through it. This phase difference is compared to a reference, and a resultant signal is used to control the point in a cycle of applied voltage when the electronic switch is closed. For a sensed increasing phase angle (decreasing power factor) between the motor voltage and current, Nola's circuit shifts the "firing point" or electronic switch closure away from the line voltage zero crossing point so as to apply a smaller portion of each half cycle of the line voltages to the motor. This has the effect of decreasing the phase angle (increasing the power factor) and reducing the power loss in the motor, which is in the form of heat caused by reactive current.

Numerous companies have manufactured power factor controllers according to the Nola patent. However, the efficiency and improvement has yet to be as great as expected, and there have been problems in adapting the circuit to three-phase operation. One of the most notable problems is the unreliability of the circuits, i.e. their tendency to self-destruct Also, it was believed that the three-phase units had problems because the phases interfered with each other.

Circuits exemplary of the improvements made to the basic Nola arrangement are illustrated in Nola's U.S. Pat. No. 4,266,177. This Nola circuit has a "snap-on" feature that applies full voltage to the motor when there are sudden increases in load. This design also has a delay circuit that applies full voltage to the motor during start-up.

U.S. Pat. No. 4,287,464 of Lee describes a "snubber" network which is placed across the electronic switch to reduce spikes that could damage the switch. Harlow's U.S. Pat. No. 4,387,329 describes a three-phase power factor circuit where the control signal from one phase is used to control the other phases. Optical isolators are used in this circuit to keep the phases from interfering with each other. Similar optical isolators are also disclosed in Nola's U.S. Pat. No. 4,459,528, and isolation transformers for the same purpose are disclosed in Nola's U.S. Pat. Nos. 4,469,998, 4,433,276 of Nola shows a three-phase circuit where the control signal is derived by summing the measured power factor of all three phases.

Another improved circuit is disclosed in a document entitled "Improved Power-Factor Controller", NASA Technical Support Package, NASA Tech Briefs, Summer 1980, Vol. 5, No. 2, MFS-25323. This improvement eliminates the resistor in series with the motor which generates the motor current signal. Instead, the voltage-current phase lag is measured as the difference between the line voltage and the voltage across the electronic switch.

Despite these improvements, both single and three-phase power factor controllers in the prior art do not provide the power savings which might be expected. Further, they are subject to high failure rates.

DISCLOSURE OF THE INVENTION

The present invention is directed to improving the efficiency and reliability of power factor controllers by suppressing transients in the controller that may cause the switch to misfire or the circuit to be damaged. Further, in multiphase power factor controllers, the sensing circuits are balanced within one percent of each other so that the timing of the firing of the switches in each phase is correct.

As stated in Nola's U.S. Pat. No. 648 the most efficient operation of the typical induction motor is with a particular current-voltage phase lag, e.g., a lag of 30°, or a power factor of 0.5. Thus efficiency is lost if the power factor is below this value or above it.

The power factor in a motor driven by a Nola type power factor controller changes depending on how much of a cycle of voltage is allowed to pass through an electronic switch to the motor. Should the control signal close the electronic switch too soon or too late, there will be wasted power. Under ideal conditions, the switch should be closed at the same time during each cycle, provided the motor load does not change. However, the present inventors have learned that conditions in the original Nola design and the subsequent improvements are not ideal.

Large currents are drawn by induction motors and the rapid switching on and off of the electronic switches creates induced voltages in the form of voltage spikes and ripple. These spikes cause the control circuits to trigger the switch at the wrong times on a random basis. Such misfiring of the switch wastes energy during a cycle.

Even with misfiring of the switch, the average phase relationship with the Nola circuit is correct. However, since a trigger which is too early is just as bad as one that is too late, in terms of efficiency, the fact that the average is correct does not improve efficiency.

One feature of the present invention is the elimination of spikes that cause the mistriggering of the switch. This will not produce any noticeable change in the power factor since the measuring equipment averages changes in power factor over a period of time. However, each cycle will save energy, and the improved circuit will consequently save energy over the prior art circuits without any apparent change in the power factor. The elimination of spikes also protects the sensitive electronic circuits that drive the switch. Thus, the circuit is more reliable.

In an illustrative embodiment of the invention, the spikes are removed by an improved capacitive-coupled power supply for the electronic circuits. This power supply absorbs both spikes and ripple that could effect the trigger time of the switch. Also the new power supply dissipates less heat and, as a result, it is more reliable.

Additionally, the improved circuit utilizes circuit breakers and fuses which provide the control circuits with additional protection. A varisitor is located across the line voltage to eliminate spikes, and the bias of some of the control circuits has been altered to obtain a cleaner trigger wave shape. The tolerances of certain critical components were also increased to increase reliability.

These same spike or transient reduction changes are carried over into a three-phase circuit design, and act to improve its operation. The prior art three-phased designs have encountered considerable problems, and it is believed that these are due to interactions between the phases. The present invention addresses this problem with pulse transformers that isolate the high voltage at the switches from the low voltage signals at the control circuits. In addition, a regulated voltage is used with these transformers to increase the isolation.

Some of the prior art three-phase circuits operate by sensing the power factor of one phase and using the sensed signal to set the voltage levels on the other phases. However, the present inventors have determined that the prior art three phase circuits have lost efficiency because of the tolerance of the resistors of the divider networks of the circuits that sense the phase difference. These resistors typically are 5% accurate in the prior art design. This may result in as much as a 10% error in the firing times for the switches of the other two phases. To correct this situation, and thereby save power without any apparent change in the power factor, the present invention utilizes especially selected resistors ich are matched so that there is less than a 1% variation in their values. Further, the output capacitors which generate comparison levels for each phase are matched so that no electronic switch firing errors are created by these components.

BRIEF DESCRIPTION OF THE DRAWINGS

The foregoing and other features of the present invention will be more readily apparent from the following detailed description and drawings of illustrative embodiments of the invention in which:

FIGS. 2(A)-2(L) are illustrations of a series of waveforms for the circuit of FIG. 1; and FIGS. 3(A)-3(D) are an illustration of an embodiment of three-phase power factor controller circuit according to the present invention, wherein

BEST MODE OF CARRYING OUT THE INVENTION

Figure 1:
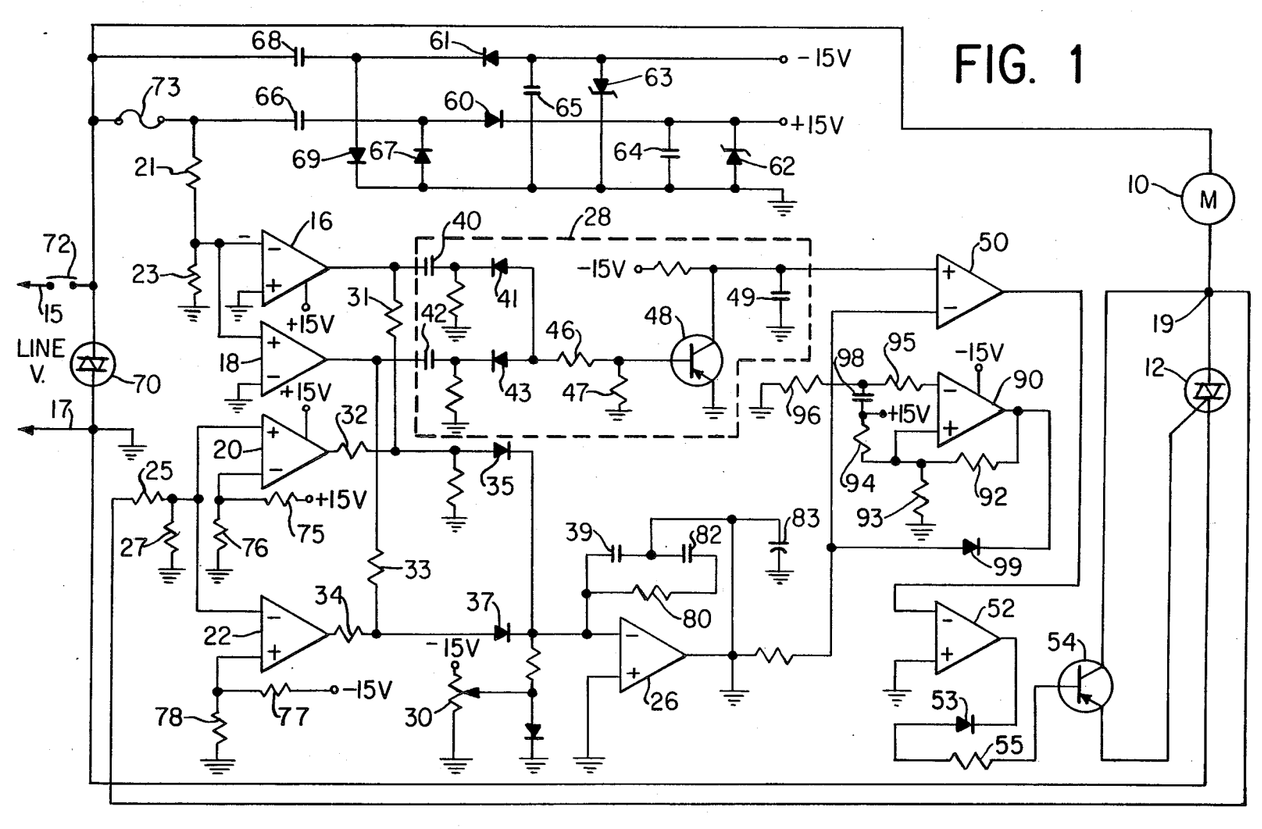
FIG. 1 is an illustrative embodiment of a single-phase power factor controller according to the present invention.

The motor control circuit shown in FIG. 1 has the basic configuration of the single-phase power factor controller of the previously described NASA Tech Briefs article. However, the circuit has been improved according to the present invention.

Figure 2:
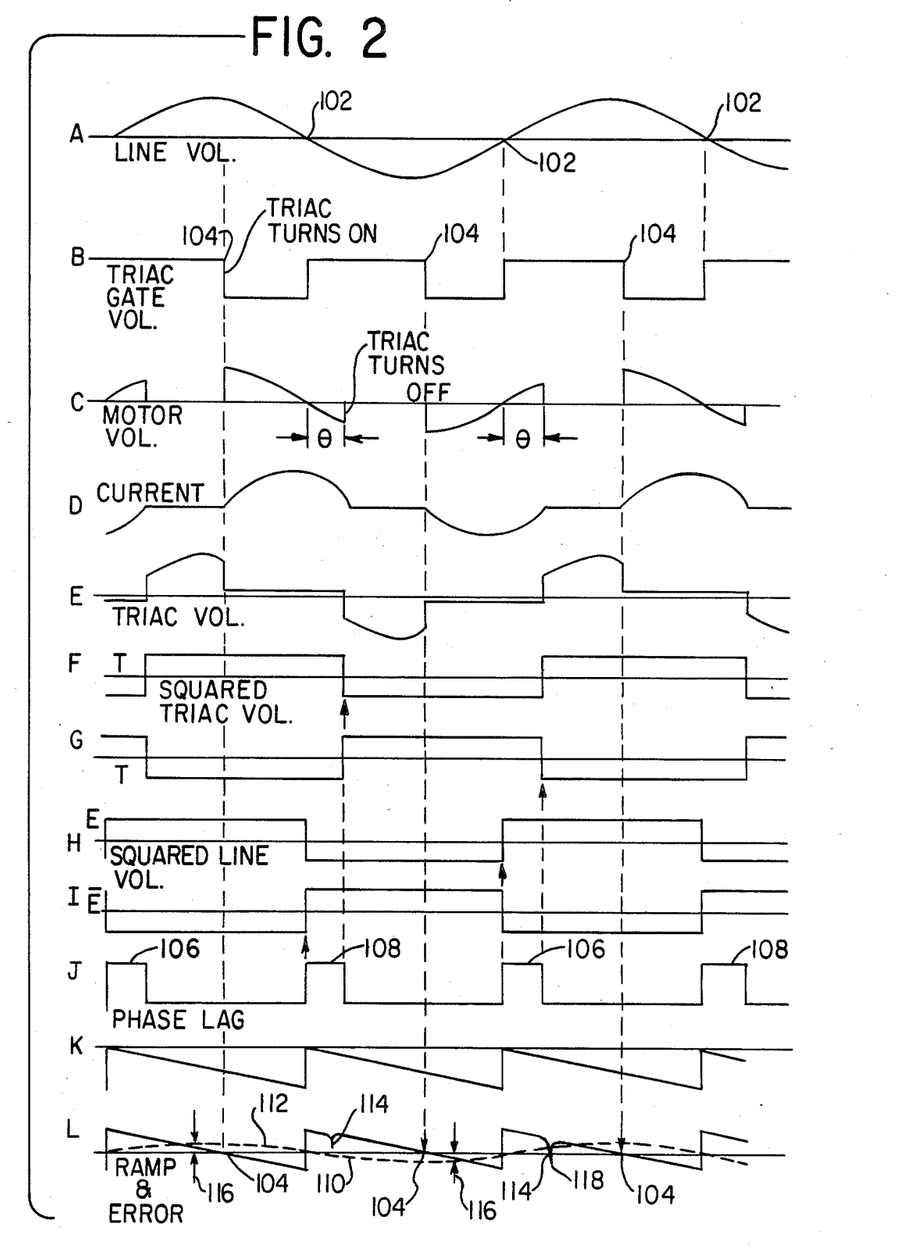

The circuit drives an induction motor 10 that is connected in series with an electronic switch, e.g. triac 12, across a 120 volt a.c. single phase line 15, 17, whose waveform is shown in FIG. 2A. The remainder of the circuit acts to control the application of power from the a.c. line to the motor 10 through the triac 12 in such a way as to reduce energy losses in the motor.

As specified in the NASA article, the control of triac 12 depends on adjusting the voltage-current lag through the motor to an optimum value, i.e. an optimal power factor. This is accomplished by measuring the lag and causing the triac to turn on at variable times from the zero crossing of the supply voltage, i.e. from points 102 in FIG. 2A. This variation in turn-on or firing time of the triac 12 assures that the power factor is proper.

The NASA article discloses that the phase difference between the line voltage 15, 17 and the voltage 17, 19 across triac 12, represents the voltage-current phase lag of the motor. In particular, the voltage across an induction motor which is controlled by an electronic switch, such as triac 12, is shown in FIG. 2C. The triac gate voltage which produces this wave-form is shown in FIG. 2B and the current through the motor is shown in FIG. 2D. When the triac turns on at points 104 in FIG. 2B, the current through the motor begins to rise slowly. It peaks and follows the voltage down with a finite phase lag. As a result, the current reaches zero after the voltage zero crossing 102. The time between the zero crossing of the voltage and the zero crossing of the current is the phase lag $\theta$ (FIG. 2C) which is to be sensed and controlled.

Even though the triac gate voltage (FIG. 2B) returns to zero at the zero crossing of the line voltage, the triac must remain on until the current through the motor goes to zero. The voltage across the triac, as opposed to its gate voltage, is shown in FIG. 2E. When the triac is off, the voltage across it follows the line voltage. When it turns on, it has only a small voltage drop across it. Hence the voltage across the triac has the motor current phase information in it and the line voltage has the motor voltage phase information in it.

To develop the phase lag signal, a portion of the line voltage, as developed across resistors 21, 23 (FIG. 1), is applied to the inverting input of the operational amplifier 16 and the non-inverting input of operational amplifier 18. The high gain of amplifiers 16, 18 acts to produce a square wave representation E of the line voltage phase and its inverse $\overline{E}$ (FIGS. 2H and 2I, respectively). Similarly, the voltage across triac 12 is applied through resistors 25, 27 to the non-inverting input of operational amplifier 20 and the inverting input of operational amplifier 22. The result is a square wave representation T of the triac voltage phase and its inverse $\overline{T}$ (FIGS. 2F and 2G, respectively). During the positive half cycle of current through the motor, the sum of the squared triac and inverse line voltages (T+$\overline{E}$) represents the voltage-current lag of the motor. This is shown as pulses 106 in FIG. 2J. This signal is developed by summing the outputs of operational amplifier 16 and 20 in resistors 31 and 32. The positive portions of this signal are applied through a diode 35 to the inverting input of operational amplifier 26.

During the negative half cycle of the line voltage, the sum of the squared inverse triac signal and the line signal ($\overline{T}+E$) represents the motor voltage-current lag, i.e. pulses 108 in FIG. 2J. The outputs of amplifiers 18 and 22 are summed through resistors 33, 34 to generate this half cycle phase signal. A diode 37 applies the positive portions of this signal 108 to the inverting input of amplifier 26. Consequently, positive pulses representing the positive and negative half cycle phase lags are produced at the input of amplifier 26.

A negative voltage from a potentiometer 30 is also fed to the inverting input of amplifier 26. This potentiometer voltage establishes a reference level for the power factor of the motor in question. Amplifier 26 also has a capacitor in its feedback loop so that it operates as a low pass filter with gain. Thus the pulses are integrated into a d.c. error signal (line 110 of FIG. 2L).

The outputs of the line voltage squaring amplifiers 16, 18 are also applied to a ramp generator circuit 28. From amplifier 16, the signal passes through a capacitor 40 and a diode 41 to a resistor divider 46, 47. The output of amplifier 18 passes through a capacitor 42 and diode 43 to the resistor divider.

Because the outputs of amplifier 16, 18 are the inverse of each other, the diodes 41, 43 alternately pass signal to the divider, and from the divider to a transistor 48. The transistor 48 is connected across a capacitor 49 that is fed through a resistor from a negative d.c. voltage source. As a result, a negative ramp is generated during each half cycle of line signal as shown in FIG. 2K. This ramp is applied to the input of a comparitor 50. The other input of comparitor 50 is the d.c. error signal from the output of amplifier 26.

The ramp of circuit 28 is synchronized with the line voltage such that its vertical reset coincides with the zero crossings of the line voltage. When the phase lag signal 110 of amplifier 26 intersects the ramp as shown in FIG. 2L, the output of comparitor 50 switches and forms the gate turn-on pulse for triac 12. Note that this crossing point corresponds to point 104 in FIG. 2B. The turn-on signal is inverted in amplifier 52, and is passed through diode 53 and resistor 55 to the gate of triac 54. Diode 53 blocks the positive output of amplifier 52, and allows only negative current to be applied to the gate of triac 54. Operation of triac 54 causes the main triac 12 to draw current through the motor.

The circuit as described so far is basically that described by Nola with a variation described in the NASA article. The phase angle is set by potentiometer 30 and the amplifier 26 varies the turn-on point 104 of triac 12 after the zero crossing 102 of the line voltage, so as to force the phase angle to remain constant at the selected value, regardless of changes in motor load. The phase lag signal is created by comparing the line voltage and the triac voltage at amplifier 26 and integrating the result in amplifier 26 to obtain an error signal.

With the circuit described so far, the energy savings have not been as great as might be expected. Also, the reliability of the circuit has not been as good as would have been desired.

The present inventors have discovered that, by making changes to the basic circuit, the efficiency of the motor driven and the reliability of the circuit are improved. These changes essentially involve extra steps to reduce the effect of voltage transients, e.g. ripple and spikes, on the operation of the circuit. The feature which most characterizes the changes is a decrease in the energy consumed by the motor with no apparent change in power factor. Also there is a marked increase in the life of the circuit compared to other commercially available circuits of the same type.

While not intending to be held to any particular theory of operation, the applicants believe that the increase in efficiency occurs by preventing sporadic misfiring of the triac 12 due to voltage spikes and ripple in the system. These spikes also are believed to be the cause of damage to parts of the circuit which results in circuit malfunction.

An induction motor has a particular optimum power factor, which the circuit attempts to maintain by triggering on the triac 12 at a particular point after a zero crossing of the line voltage. If it is triggered on too soon or too late, it is believed that there will be an incremental loss of energy during that cycle. However, since conventional power factor measuring devices average the signal over a period of time, the misfiring of the triac from cycle to cycle will not show up.

The misfiring can be due to large amounts of ripple in the plus and minus voltage power supplies. This can induce ripple in the output of amplifier 26 (shown in dotted line as signal 112 in FIG. 2L) and in the ramp signal from circuit 28, such that comparator 50 varies its switching point at line frequency or some harmonic thereof. In addition, spikes 114 (FIG. 2L) generated by the motor 10 or triac 12 can get into the error signal or ramp and produce errors in the switching of comparator 50. Further, these spikes may directly affect amplifier 52 or gate triac 54. The ripple 112 could cause the firing point to be at point 116 and the spikes could cause it to be at point 118, instead of at 104 where it should be (FIG. 2L).

A first step in overcoming the problem is to greatly reduce the ripple in the circuit through the use of an improved d.c. power supply. In the prior Nola circuit, the d.c. power is obtained by dropping the a.c. line voltage through a high wattage resistor to a pair of diodes located in the same position as diodes 60, 61 in FIG. 1. The Nola diodes are connected to form a half wave rectifier. In the Nola circuit, as well as the circuit of FIG. 1, zener diodes 62, 63 and large capacitors 64, 65 regulate the plus and minus d.c. voltage.

In the present invention, the resistor has been replaced with capacitors 66, 68 that couple the line voltage to the rectifiers. Further, diodes 67, 69 have been added to convert the circuit into a full wave rectifier.

The elimination of the line feed resistor removes a large heat source from the circuit, which reduces fire hazards and improves the circuit reliability. The capacitively-coupled, full-wave rectifier has much lower ripple than the prior art circuits, and thus eliminates a source of misfiring of the electronic switches. The capacitors 64, 65 also absorb spikes and reduce their effect.

To further reduce line spikes and potential damage to the controller, a cross-line component 70 and a line current circuit breaker 72 are included. The cross-line component is typically a metal oxide varisitor. Also, a lower current fuse 73 is included in the power supply.

- Bias resistors 75, 76 and 77, 78 are connected to the plus 15 volt and minus 15 volt supplies, respectively. These resistors supply positive bias to the inverting input of amplifier 20 and negative bias to the non-inverting input of amplifier 22. The result is to produce cleaner triac voltage phase wave-forms which in turn assist in the elimination of misfiring of the main triac.

Capacitors 40, 42 at the input of ramp circuit 28 and resistor 55 are critical components. Therefore, the voltage and power rating of these have been increased to at least 30 volts and one-half watt, respectively, as another means of improving circuit reliability.

Resistor 80 and capacitors 82, 83 are connected to capacitor 37 to form a feedback network for operational amplifier 26. This network acts as a low pass filter to integrate the phase error signals. It also provides up to an 8 second delay to keep the controller from starting to operate when it is first turned on. After the delay period, the voltage applied depends on the relationship between the sensed phase lag and the reference level which is set by potentiometer 30.

An operational amplifier 90 is provided with resistors 92, 93 connected in series between its output and ground. The junction of the two resistors is connected to the non-inverting input of the amplifier. Also, a resistor 94 is connected between the non-inverting input and the plus 15 volts supply. Between the inverting input of the amplifier 90 and ground there are series resistors 95, 96. The junction of these resistors is connected through a capacitor 98 to the plus 15 volt supply. Finally, the output of amplifier 90 is connected through a diode 99 to the output of error amplifier 26.

Amplifier 90 and its associated network operate to provide a soft start for the motor. They block the error signal from amplifier 26 during its start so the controller applies an increasing voltage to the motor until it is up to speed and is ready to be adjusted to the load. This circuit operates by creating a positive going ramp due to capacitor 98. The ramp starts negative at a level set by bias resistors 93,94. When the ramp goes positive in 6-9 seconds, its effect on the output of amplifier 26 is broken because of diode 99.

Test have been conducted comparing the circuit in the NASA article against the present invention as shown in FIG. 1. In such tests there was an increase in the energy saved without any significant change in power factor.

Figure 3A:
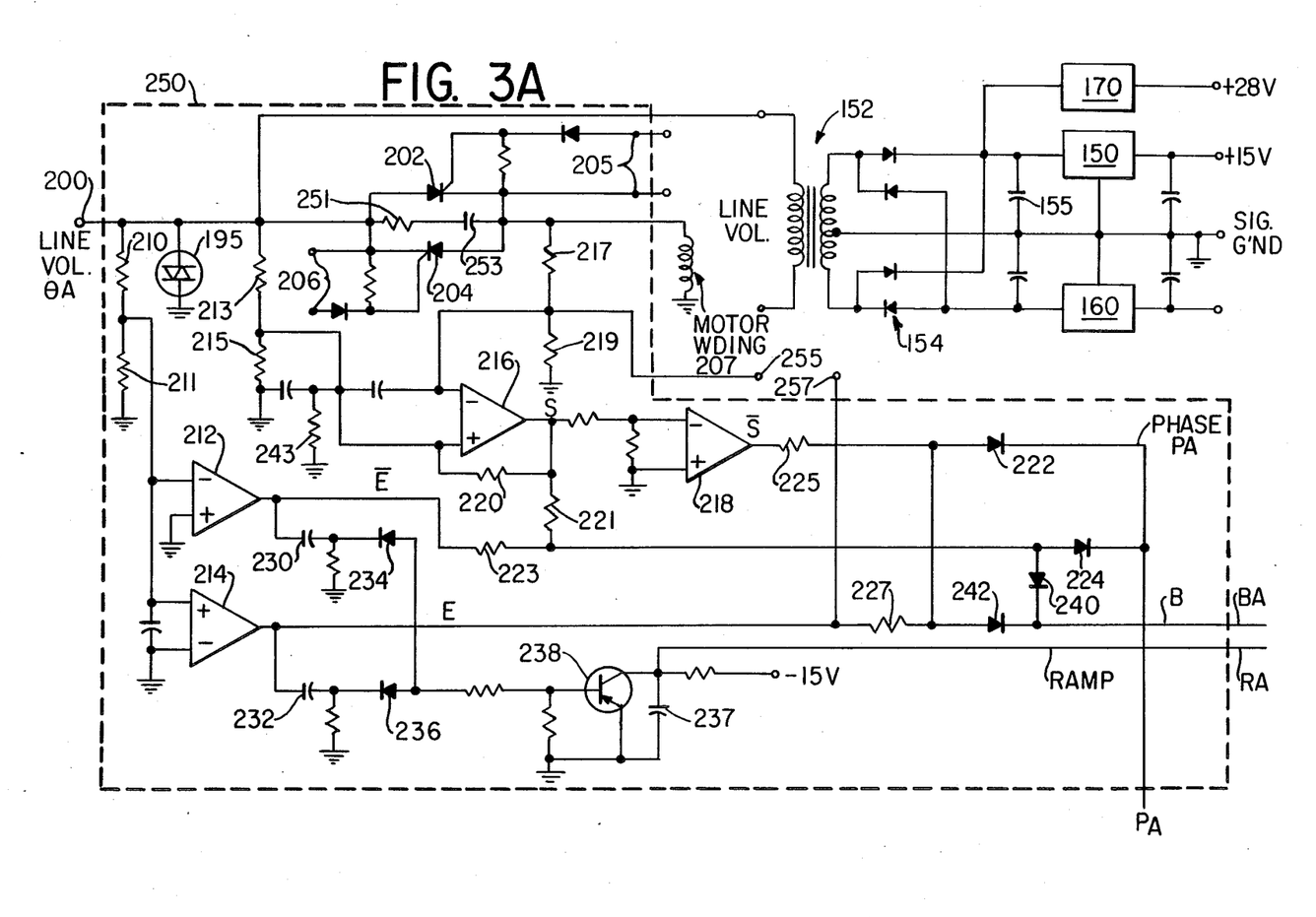
FIG. 3(A) illustrates the phase A line sensing circuit and the power supply.

The principles applied to the single phase motor drive circuit of FIG. 1 can also be adapted to a three-phase motor drive circuit as shown in FIGS. 3A-3D. In particular, a well regulated power supply for the circuit elements is achieved in the circuit of FIG. 3 with integrated circuit regulators 150 and 160 for the plus and minus 15 volt supplies, respectively (FIG. 3A). The power for the regulators is derived from line voltage which may be any one of the three phases available. This line voltage is passed through a transformer 152 to a full wave diode rectifier 154. The plus and minus voltages from the rectifier are stored in capacitors 150, 155. This capacitive voltage is applied to the integrated circuit regulators 150, 160 to produce the plus and minus output voltages. In addition, a regulator 170 is connected to the output of rectifier 154 to generate a regulated 28 volt output. This 28 volt output is utilized in the isolation transformers 292, 294, 296 shown in FIG. 3C.

Figure 3B:
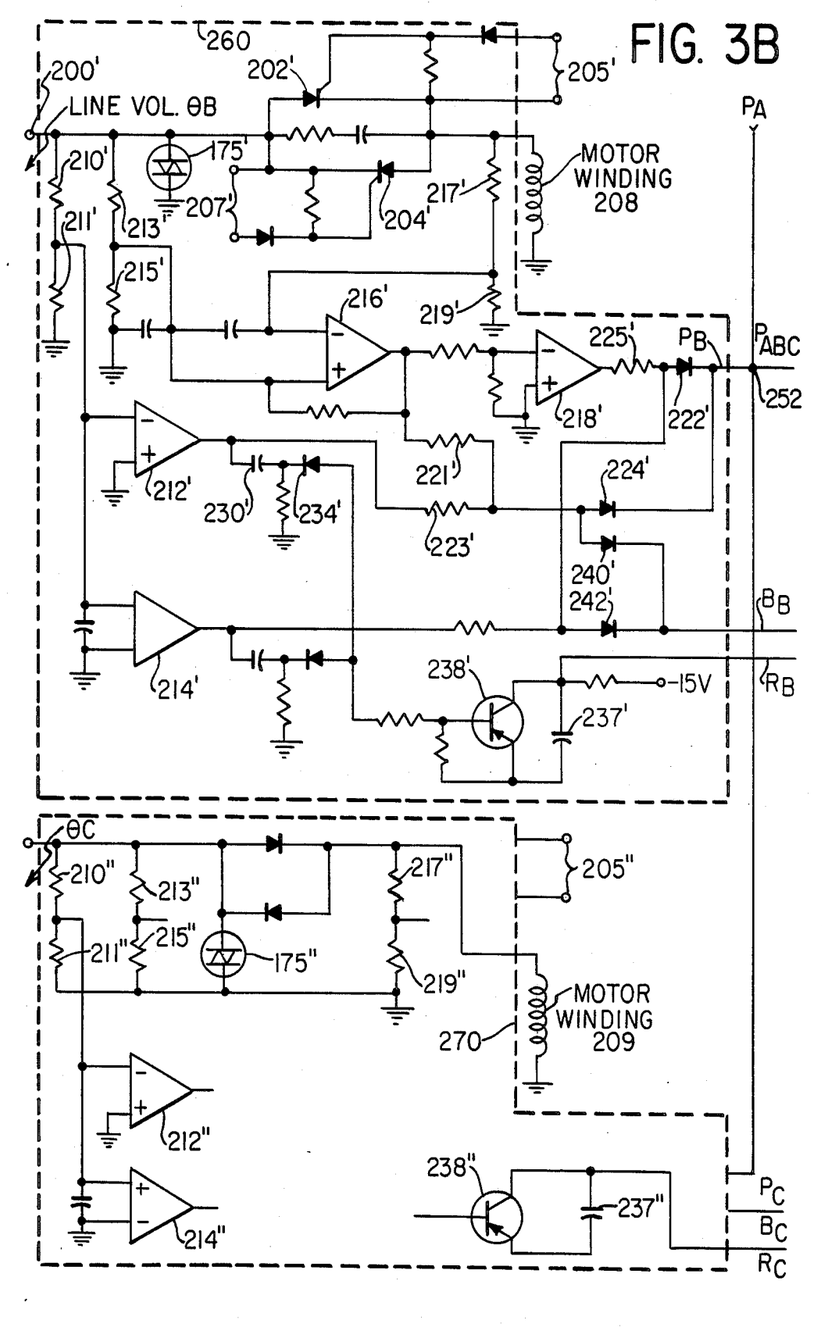
FIG. 3(B) illustrates the phase B and phase C line sensing circuits.

Improved operation in a three-phase circuit is also obtained by locating varisitors 175, 175′, 175″ across the input line voltages 200, 200′, 200″ for phases A, B and C, as shown in FIGS. 3A and 3B. The other changes made to improve the efficiency and reliability of the circuit will be explained below, after the basic operation of this circuit is described.

In general the circuit or FIG. 3 operates in the same manner as the circuit in FIG. 1, except that it is duplicated three times, once for each phase, and it has been modified to operate with SCRs, instead of triacs.

Triacs are bi-directional devices, i.e., they may pass current in either direction. However, SCRs are unidirectional devices. In order to pass both halves of the phase A line voltage at terminal 200 to the phase A winding 206 of a three-phase induction motor, the circuit includes two SCRs or electronic switches 202, 204, which are connected in parallel with opposite polarity. Located across the SCRs 202, 204, is a spike surpressor circuit comprised of resistor 251 in series with capacitor 23. These circuits help to protect the SCRs from damage due to switching transients.

Under full load conditions, each SCR may be gated on for alternate half cycles by control signals applied to terminals 205, 206 respectively. These control signals come from the isolation transformers 292, 294, 296 shown in FIG. 3C. When less than full load is applied to the motor, the circuit causes these control signals to fire the SCRs at particular times after the zero crossings of the line voltage so that less than full voltage is applied to the motor windings. As result, the motor power factor can be controlled.

The circuit measures the power factor of each phase and creates an error signal which is used to adjust the power factor of each phase to the optimum value, based on an average of the measured phase lags. As in the circuit of FIG. 1, the phase is determined by comparing the phase of the voltage across the SCRs with the phase of the line voltage. The line voltage phase signal E and its inverse $\overline{E}$ are derived by dividing down the line voltage in resistors 210, 211 (FIG. 3A) and squaring the signal in inverting and non-inverting operational amplifiers 212, 214, respectively. The voltage at the input to the SCRs is divided in resistors 213, 215 and is applied to the positive input of operational amplifier 216. The voltage at the output of the SCRs is divided by resistors 217, 219 and is applied to the negative input of amplifier 216. Consequently, the output of amplifier 216 is a square wave signal $\overline{S}$ having the phase of the voltage across the SCRs. The inverse S is obtained by passing the signal through invertor 218. By combining E and $\overline{S}$ with $\overline{E}$ and S, the phase signal is obtained. This value is derived by summing $\overline{E}$ and $\overline{S}$ in resistors 221, 223. The values for E and S are summed in resistors 225, 227. The two values are then combined through diodes 222, 224 to obtain the phase error signal $P_A$ for phase A.

A ramp signal sychronized with the line voltage, like that used in FIG. 1, is also needed. This ramp is generated by combining the E and $\overline{E}$ signals through capacitors 230, 232 and diodes 234, 236 and applying the resultant signal to the base of transistor 238. Capacitor 237 across the transistor builds up a ramp voltage $R_A$ from the negative supply voltage under the control of the combined line signals E, $\overline{E}$. Diodes 240, 242 are also used to sum the E+$\overline{S}$ signal with the $\overline{E}$+S signal to derive a blanking signal $B_A$. This signal $B_A$ is used to assure that the control for the phase A SCRs is operative only during the correct portion of a cycle of the three phase line voltage.

Amplifier 216 has positive feedback created by resistor 220. This allows it to switch states and then latch in that state while the SCR is on. Latching occurs even though the voltage across the SCR is low and the voltages on each side are high. The blanking pulses, e.g. $B_A$, make sure the SCR is turned off for at least a portion of each cycle so this amplifier can unlatch.

The portion of the circuit that derives the phase error signal is designated as phase sensor circuit 250 and has been enclosed in dotted line in FIG. 3A. Nearly identical phase sensor circuits 260, 270 have provided for the phase B and phase C motor windings as shown in FIG. 3B. Consequently, the parts in FIG. 3B which are the same as in FIG. 3A have been given the same reference numbers, but have been marked by a' or " to represent phase B and phase C circuits, respectively. In addition, some of the circuit elements for the phase sensor circuit 270 for phase C has not been shown to simplify the drawing.

The one difference between circuits 250, 260 and 270 is that the phase A sensor circuit 250 includes a resistor 243 from the positive input of amplifier 216 to ground. This resistor acts to preserve the resistive load balance on the plus and minus inputs to amplifier 216. Note that amplifier 216 has its negative input connected to a terminal 255. Terminal 255 is connected to the clutched-in-load circuit in FIG. 3D, which circuit has an impedance which is matched by resistor 243. It is important to balance the loads across amplifier 216 because it must sense and amplify the small difference in the large voltages across the SCR's. Therefore it requires good common mode rejection, which might be upset by an imbalance in the loads on its two inputs.

Each of the phases error signals $P_A$, $P_B$, $P_C$, from circuits 250, 260, 270 are tied to together at point 252 (FIG. 3B). This combined signal is a series of pulses like those in FIG. 2J, but include three pulses for each half cycle, instead of one. Since the input line voltage phases have their zero crossing points spaced by 120°, the phase lag pulses have their rising edges space by 120° in the three-phase circuit. The falling edges of the phase lag pulses are based on the phase lag for each particular phase.

The ramp voltages across the capacitors 237, 237', 237", in each phase sensor circuit are also offset from each other by 120°. These are identified as signals $R_A$, $R_B$, $R_C$ for each phase, respectively. As will be shown, these signals are compared with the phase error signals, as in the single phase design, in order to produce the control signals for the SCRs.

Figure 3C:
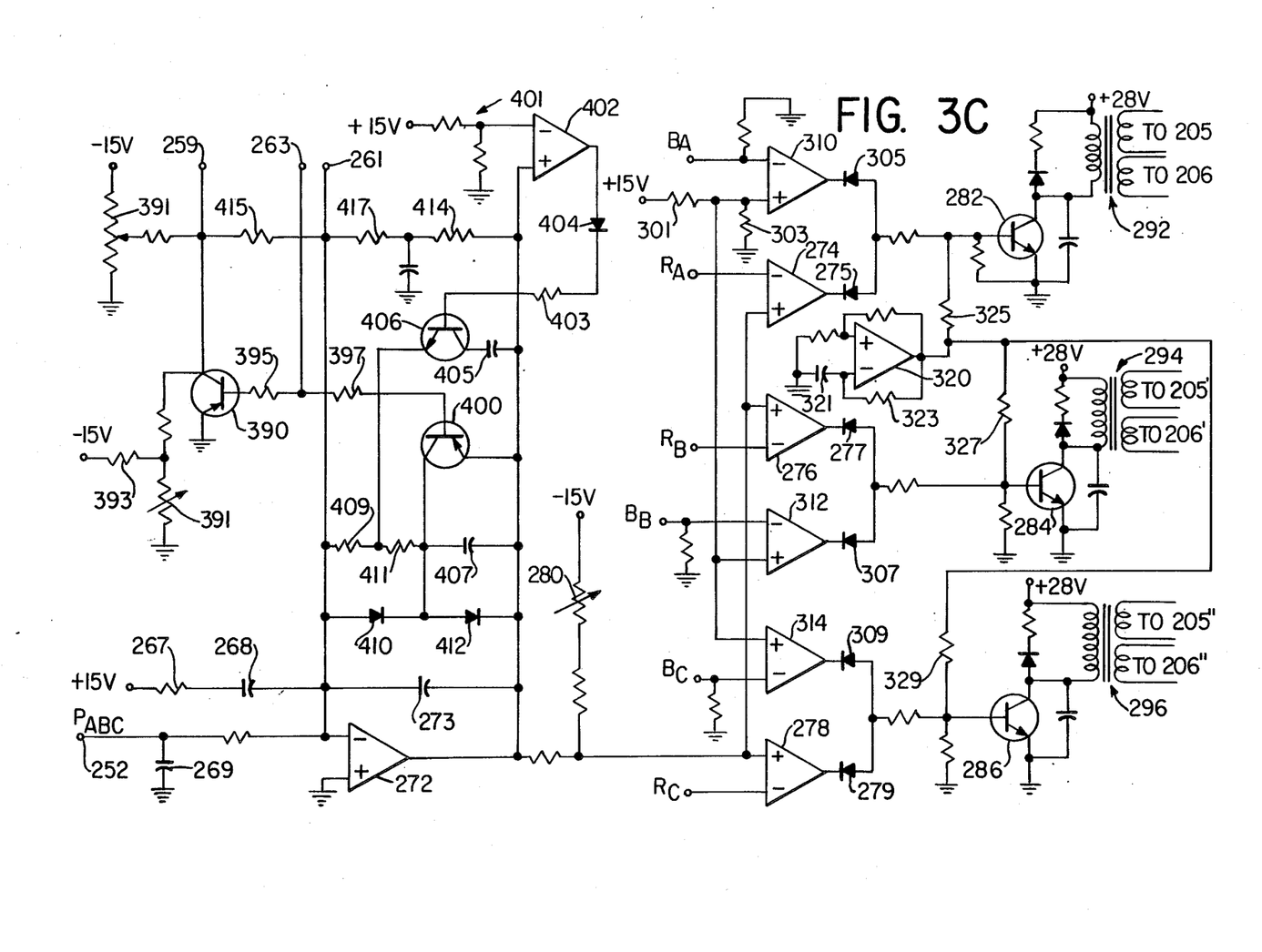
FIG. 3(C) illustrates the phase comparator and the firing signal circuits, including the isolation transformers for each phase.

The combined phase error pulses at point 252 in FIG. 3B are delivered to point 252 in FIG. 3C. This is the input to operational amplifier 272. Because of feedback capacitor 273, this amplifier 272 integrates the phase error pulses to produce a d.c. error signal at its output which is related to the combined phase error pulses. As in the single phase circuit of FIG. 1, the control pulses for the electronic switches, e.g. SCRs 202, 204, are initiated based on a comparison of this error signal and the ramp signals. In FIG. 3C the error signal - ramp comparisons, are made in operational amplifiers 274, 276 and 278 for phases A, B and C, respectively. In each phase, the error voltage is applied to the non-inverting input of the amplifier and the ramp signals $R_A$, $R_B$, and $R_C$ are applied to the respective inverting inputs. The adjustable bias for setting the power factor is achieved with potentiometer 280.

The change in the output of the amplifiers 274, 276 and 278 is passed through diodes 275, 277 and 279 to transistors 282, 284 and 286, respectively. These transistors drive double-bobbin pulse transformers 292, 294, 296, respectively. The two outputs of each of these transformers are connected to the SCR gate terminals 205, 206 in FIG. 3A, and 205', 205", 207' and 207" in FIG. 3B.

A reference voltage developed by resistors 301, 303 is applied to the positive inputs of operational amplifiers 310, 312, 314. A non-inverting input of these amplifiers receives the blanking signals $B_A$, $B_B$, $B_C$ respectively. Diodes 305, 307, 309 apply the output of the amplifiers 310, 312, 314 to transistors 282, 284, 286, respectively. The diodes connected to the input transistors 282, 284, 286, act like an AND-gate, so that the control pulses for each phase are generated only when the blanking pulses permit. This assures that the SCR's for each phase are turned off for a portion of each phase so amplifier 216 can unlatch and be ready for the next cycle when it must switch to indicate the motor current phase.

Amplifier 320 in FIG. 3C has a capacitor 321 from its inverting input to ground. This capacitor in combination with feedback resistor 323 creates a 40 KHz oscillator. The signal from the output of oscillator 320 passes through resistors 325, 327, 329 to the inputs of transistors 282, 284, 286, respectively. As a result the 120 Hz turn on pulses are actually 40 KHz bursts. This high frequency signal permits the use of a smaller size transformer.

Figure 3D:
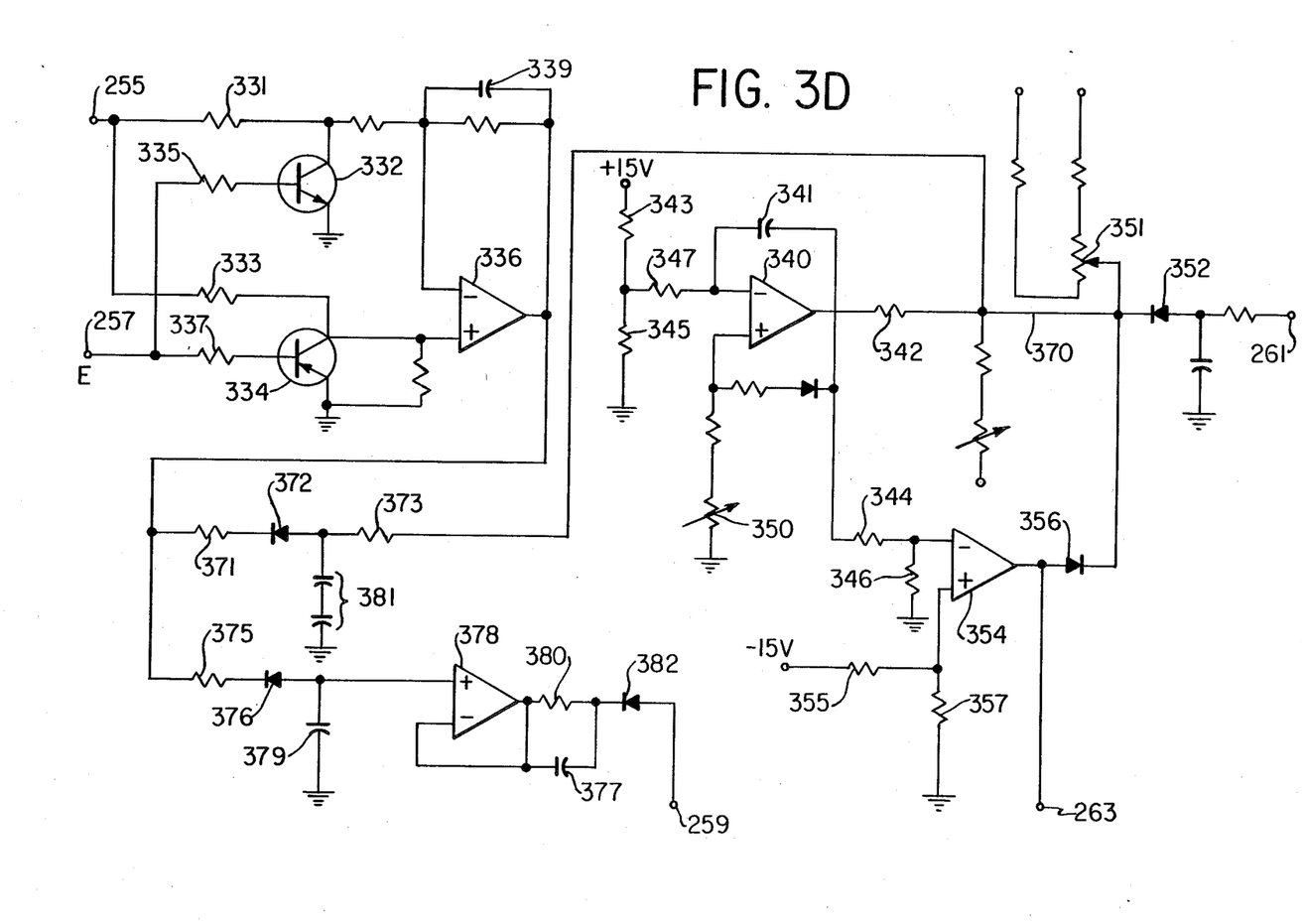
FIG. 3(D) illustrates the "start-up" and "clutched-in-load" circuits

The divided phase A motor winding voltage from terminal 255 of FIG. 3A is directed to terminal 25 of FIG. 3D at a pair of resistors 331, 333 which are connected to the collectors of transistors 332, 334. Also the squared line voltage E at terminal 257 is applied to resistors 335, 337 of this circuit, which in turn are connected to the bases of transistors 332, 334. Signals from the transistors collectors are applied to the respective negative and positive terminals of an operational amplifier 336, which includes a capacitor 339 in its feedback path.

Because of this arrangement, the controller can handle the sudden imposition of a large load. The voltage at the input 255 is the motor voltage and, because of back EMF, this voltage reverses during half cycles. In particular on the positive half-cycle, it becomes negative half way through the cycle and visa-versa, when a large load is applied. This information can be used to detect the application of the large load. Transistors 332 and 334 alternate to apply either the positive or negative cycle of voltage to operational amplifier 336. When the large polarity reversed voltage exists, the output of amplifier 336 is fed through resistor 375 and diode 376 to operational amplifier 378. The diode eliminates the positive portion of the signal, while the negative portion, which indicates a clutched-in load, is stored in capacitor 379. Amplifier 378 acts as a high impedance follower, capacitor 377 speeds the signal up around output resistor 380, and diode 382 prevents it from loading other parts of the control circuit. From resistor 380 the signal passes to terminal 259, which is connected to the energy saver circuits shown in FIG. 3C, in particular to the collector of transistor 390. During normal operation transistor 390 is off so the signal passes through resistor 415 to the input of amplifier 272. The effect of this is to increase the duty cycle to compensate for the heavy load. In effect, it causes a voltage to be applied to operational amplifier 272 which turns on the SCR,s for a greater period of time.

When the line voltage is applied to the circuit of FIG. 3, the power supply shown in FIG. 3A produces regulated plus and minus 15 volt levels. As a result, a signal is applied to the input of soft-start amplifier 340 in FIG. 3D through divider resistors 343, 345 and input resistor 347. A feedback capacitor 341 is connected to amplifier 340 so that it acts as an integrator or negative ramp generator. The negative ramp from 340 is applied to a summing terminal 370 through resistor 342. The values of capacitor 341 and resistor 347 are selected so that the circuit has a time constant of 6-9 seconds, i.e. it takes that length of time before the voltage across capacitor 341 builds up sufficiently enough for the input to exceed the reference level set by a potentiometer 350 and for the amplifier 340 to switch states.

The negative going ramp signal produced by amplifier 340 starts at zero. Since a zero level signal would mean that the motor would initially have no current applied to it, potentiometer 350 is used to adjust the bias of operational amplifier 340 so tht there is some current, even at the initial start condition. The potentiometer 351 is connected to summing terminal 370 and acts as a factory adjusted vernier which applies additional initial start current. This start current is applied to terminal 261 through a diode 352 which blocks positive voltage. The signal at terminal 261 is fed to the inverting input of operational amplifier 272 in FIG. 3C. Thus, an increasing negative signal is applied to the input of operational amplifier 272, which in turn increases the positive output and the amount of current supplied to the motor. Typically, a 6-9 second ramp signal is used in this condition.

Referring back to FIG. 3D, operational amplifier 354 also receives part of the ramp output signal. Since it has no feedback, it operates with high gain as a gate. Thus when the ramp signal from the amplifier 340, as divided by resistors 344, 346, exceeds the negative voltage applied through divider 355, 357, amplifier 354 changes state quickly from a negative signal, which has no effect because of diode 356, to a positive voltage which overwhelms the ramp output signal from operational amplifier 340. This effectively terminates the soft-start condition.

The high positive voltage from operational amplifier 354 is also applied to terminal 263 which is connected to the base of transistors 390 and 400 in FIG. 3C. This applies a positive voltage to transistors 390 and 400 through resistors 345, 347, respectively. During a soft-start condition, both transistors 390 and 400 are switched on, so that they effectively short out the voltage across resistor 391, which is divided down from the negative supply voltage through resistor 393, as well as the voltage across capacitor 407 and diode 412. As a result, the soft start signal is a controlling input to operational amplifier 272. When the soft start state is over, transistors 390 and 400 switch off, and the soft start voltage no longer controls. Instead, voltage is applied from resistor 391 to the inverting input.

The output of amplifier 336 is applied to resistors 371, 373 and diode 372 to terminal 370. The combined signal at terminal 370 is the soft-start signal. During initial start before the motor is turning, it has a reversed portion of each cycle as described in connection with the clutched-in-load circuit. The positive part of this signal during start-up is blocked by diode 372 and is stored in capacitor 381. This voltage gets lower as the motor comes up to speed. Normally the motor has a nonlinear start characteristic so it tends to snap up to speed. However by summing the negative voltage from capacitor 381 through resistor 373 at terminal 370, the soft-start signal can cause the motor to increase in speed from its stalled condition in a linear manner.

Capacitor 273 in the feedback of amplifier 272 acts to integrate the input signal. The $P_{ABC}$ signal is a combination of the phase pulses. Because of input capacitor 269, the rising edge of these pulses is rolled off. Due to integrating feedback capacitor 273 these phase pulses are converted into a DC signal with a 360 Hz ripple at the output of amplifier 272. During initial turn-on, a plus 15 volts is applied through resistor 267 and capacitor 268 to the inverting input of the amplifier 272. This would result in a large negative output which would turn off the motor immediately upon turn-on. To prevent this, the output is clamped by diodes 410 and 412 to the value of two diode drops. However, during soft start, the value is clamped to only one diode drop because transistor 400 shorts out diode 412. When transistor 400 turns off at the end of the soft start, a capacitor 407 is further included in the circuit to increase the integrating feature.

When the sudden load circuit of transistors 332, 334 and operational amplifier 336 detects the application of a large load, the signal applied to terminal 259 in FIG. 3C is delivered through resistors 415, 417 and 414 to the input of operational amplifier 402. This circuit switches state positively. As a result, a positive output signal is applied through resistor 403 to transistor 406. The effect of this is to place capacitor 405 in parallel with capacitors 407 and 273, partially eliminating the effect of resistor 411 and stablizing the circuit during the surge condition.

The double-bobbin isolation transformers 292, 294, 296 have the primary wound about the first section or bobbin of the transformer, while the secondaries are wound about the second bobbin. Because of this construction, the high voltage levels at the SCR are isolated from the low voltage signal levels in the control circuit. In addition, the 28 volt regulated supply which is attached to one end of the transformer increases the isolation. The use of this transformer constitutes one of the features of the present invention.

The circuit generally described with reference to FIG. 3 has been built and tested for use with 460 volt a.c., three-phase operation delivering 10 h.p. to three phase induction motors. This circuit has been found to be highly efficient and highly reliable. One reason for the increase in efficiency is that the sensing resistors 210, 211, 213, 214, 217, 219 as shown in FIG. 3A are very critical. Thus, not only have one percent resistors been used in this application, the actual resistor values have been measured and resistors have been selected which have the least deviation from each other. This assures that the resistance values themselves are all wihin one percent of each other. The reason this has an advantageous affect on efficiency is that it assures that the phase lag pulses accurately reflect the phase and the common mode rejection ability of amplifier 216 is sufficient to handle the voltages across the SCR's. The same resistors for phases C and D are also similarly selected so the relative phase lags for each phase are accurate with respect to each other.

The capacitors 237, 237', and 237" which are utilized to form the ramp signals are also measured and selected so that they have similar values. If one of these capacitors were larger than the other, the ramp generated by that capacitor would be slightly different than the others so that phase error comparison would be off between phases. Each such small error results in a decrease in the efficiency of the circuit and has to be avoided.

As previously noted, the three phase circuit also has provisions to reduce spikes which may cause misfiring of the SCRs. This is accomplished with the regulated voltage supply shown in FIG. 3A, as well as the varisitors 175 located across the line voltages. In addition, snubber networks 251, 253, which are known in the prior art, are included across the SCRs and provide additional suppression of spikes. The regulated power supply eliminates ripple which may be a cause of inaccurate firing of the SCRs in addition to random spikes generated in the circuits.

As an alternative to the use of the double-bobbin transformers, optical isolators may be used to prevent phase interference. Such optical isolators were recommended in the prior art. Nevertheless, it is believed that the double-bobbin transformers of the present invention provide more stable operation.

While the invention has been particularly shown and described with reference to preferred embodiments thereof, it will be understood by those skilled in the art that various changes in form and detail may be made therein, without departing from the spirit and scope of the invention.

We claim:

1. A power control system for an a.c. induction motor, comprising:
   an electronic switch means, located between an a.c. power line and a winding of the induction motor, for controlling the connection of the power line to the motor winding during each cycle of the a.c. power;
   current sampling means for producing a current signal indicative of the phase of current through the winding of the motor;
   voltage sampling means for producing a voltage signal indicative of the phase of the voltage across the winding of the motor;
   phase detection means for comparing the current signal and voltage signal to produce a phase difference signal; and
   control means for comparing the phase difference signal to a preset reference signal and producing an error signal that controls the time period during each cycle of a.c. voltage when the electronic switch means connects the power line to the motor winding;
   characterized in that the system further includes
   a capacitively-coupled, regulated, power supply means for accepting a.c. voltage from the power line through at least one capacitor and providing a positive d.c. voltage at one output and a negative d.c. voltage at another output for operation of the current sampling means, voltage sampling means, phase detection means and control means, said power supply means including
   first and second capacitors, each having one end connected to the a.c. power line;
   a first paid of diodes connected in series from the positive output to a ground, said first pair of diodes having the same orientation, with the cathode of one of the first pair of diodes connected to the positive output and the anode of the other one connected to ground, the other end of said first capacitor being connected to the junction of the diodes of the first pair;
   a second pair of diodes connected in series with the same orientation such that the anode of one of the second pair is connected to the negative output and the cathode of the other is connected to ground, the other end of said second capacitor being connected to the junction of the diodes of the second pair;
   a third capacitor located between the positive output and ground;
   a fourth capacitor located between the negative output and ground;
   a first zener diode connected from the positive output to ground and arranged to provide a regulated d.c. positive voltage; and
   a second zener diode connected from the negative output to ground and arranged to provide a regulated d.c. negative voltage.

2. A power control system as claimed in claim 1 wherein said power supply means include a full wave rectifier.

3. A power control system as claimed in claim 1 further including a voltage transient suppression circuit located across the a.c. power line.

4. A power control system as claimed in claim 3 where said voltage transient suppression circuit is a varisitor.

5. A power control system as claimed in claim 1 further including a fuse between the a.c. power line and said power supply.

6. A power control system for a multi-phase a.c. induction motor, comprising:
   a plurality of electronic switch means, each switch means being located between one phase of a multi-phase a.c. power line and one respective winding of the induction motor, each of said switch means controlling the connection of one phase of the power line to one winding of the motor during each cycle of the a.c. power;
   current sampling means for producing current signals indicative of the phases of the current passing through the windings of the motor;
   voltage sampling means for producing voltage sampling signals indicative of the phases of the voltages across the windings of the motor;
   phase detection means for comparing said current signals and voltage signals for respective windings to produce phase difference signals for each phase; and
   control means for comparing the phase difference signals to preset reference signals and producing at least one error signal that controls the time period during each cycle of a.c. voltage when the respective electronic switch means connect an a.c. line phase to the respective motor winding;
   characterized in that said current sampling means and said voltage sampling means include input resistor divider networks located between the input of each electronic switch means and ground, and output divider networks located between the output of each electronic switch means and ground, each resistor divider network including an upper resistor and a series connected lower resistor, the junctions of each upper and lower resistor providing signals containing voltage and current phase information for each winding, the upper resistors of each input network are within 1% of each other, the lower resistors of each input network are within 1% of each other, the upper resistors of each output network are within 1% of each other and the lower resistors of each output network are within 1% of each other.

7. A power control system as claimed in claim 6 further including a regulated, full wave power supply means for accepting a.c. voltage from one phase of the power line and providing d.c. power for operation of the current sampling means, the voltage sampling means, phase detection means and control means.

8. A power control system as claims in claim 6 further including a voltage transient suppression circuit located across the power line.

9. A power control system as claimed in claim 7 wherein said switch means are pairs of oppositively oriented silicon-controlled rectifiers, one pair for each motor winding; and wherein said control means includes transformers with primary windings and secondary windings which create control pulses for said silicon-controlled rectifier, one side of the primary winding of said transformers being connected to a regulated d.c. voltage and the other side being switched by said control means.

10. A power control system as claimed in claim 9 wherein said transformers are double-bobbin transformers.

11. A power control system as claimed in claim 7 wherein said power supply means is capacitively coupled to the phase of the power line.

12. power control system for an a.c. induction motor, comprising:

an electronic switch means, located between an a.c. power line and a winding of the induction motor, for controlling the connection of the power line to the motor winding during each cycle of the a.c. power;

current sampling means for producing a current signal indicative of the phase of current passing through the winding of the motor;

voltage sampling means for producing a voltage signal indicative of the phase of the voltage across the winding of the motor;

phase detection means for comparing the current signal and voltage signal to produce a phase difference signal; and control means for comparing the phase difference signal to a preset reference signal and producing an error signal that controls the time period furing each cycle of a.c. voltage when the electronic switch means connects the power line to the motor winding;

characterized in that said current sampling means and said voltage sampling means include an input resistor divider network located between the input of the electronic switch means and ground, and an output divider network located between the output of the electronic switch means and ground, each resistor divider network including an upper resistor and a series connected lower resistor, the junctions of each upper and lower resistor providing signals containing voltage and current phase information for the winding, the upper resistors of the input network and the output network are within 1% of each other, and the lower resistors of the input and output network are within 1% of each other.

13. A power control system as claimed in claim 12 further including a regulated, full wave power supply means for accepting a.c. voltage from one phase of the power line and providing d.c. power for operation of the current sampling means, the voltage sampling means, phase detection means and control means.

14. A power control system as claimed in claim 13 wherein said power supply means is capacitively coupled to the power line.

* * * * *